United States Patent Office 3,116,307
Patented Dec. 31, 1963

---

3,116,307
ORGANO-TIN METALLIC COMPOUNDS
Frederick C. Leavitt, Framingham, and Francis Johnson, West Newton, Mass., assignors to The Dow Chemical Company, Midland, Mich., a corporation of Delaware
No Drawing. Filed May 7, 1959, Ser. No. 811,513
1 Claim. (Cl. 260—429.7)

This invention relates to certain organo metallic compounds identified as heterocyclic compounds in which the metal is incorporated into a ring, which is characterized by the presence of a conjugated double bond system.

Cyclic organic compounds of metals or metalloids of a variety of structures are known, but, in general, they are characterized by their being saturated ring compounds or their merely having one double bond. The few previously known organo metallic (or metalloid) systems which contain the hetero atom as part of a conjugated system are known to exhibit unique properties with regard to thermal stability and chemical reactivity. Incorporation of elements other than those known to exist in such systems would be desirable for a variety of purposes, which include polymerization reactions in which it is desired to have a particular metal enter into the reaction or even function as a catalyst in the polymerization reaction. It may be desirable to introduce a metal into a reaction medium as an organo metallic compound accompanied by a conjugated double bond system. Also, for many purposes, for example, fluid catalyst activity in the petroleum industry, the presence of a metal in the form of a compound which would be soluble in the petroleum medium would be highly advantageous in providing reaction sites and catalysts for reaction.

It is, accordingly, a fundamental object of this invention to provide a process for preparing organic compounds of metals and metalloids, wherein the metal or metalloid will have at least two of its valences satisfied by incorporation into a radical or combination of organic radicals forming part of a conjugated system.

It is a further object of the invention to provide a sequence of new compounds characterized by the incorporation of a metal or metalloid atom into an organic moiety which may be cyclic and includes a conjugated double bond system and renders the metal available in this form for use in reactions.

Other objects and advantages of the invention will in part be obvious and in part appear hereinafter.

The invention, accordingly, is concerned with new compounds which may be characterized as metal or metalloid compounds in organic form with a conjugated system of double bonds in the organic radical portion of the compound, the radical itself being non-aromatic and attached to the metal or metalloid and may make the compound itself heterocyclic, the metal or metalloid being an element other than carbon, sulphur, selenium, tellurium, oxygen or nitrogen, and more specifically, may include phosphorus, tin, mercury, magnesium, silicon, arsenic, bismuth, germanium, and antimony. A limitation upon the formation of the organo compound is the availability of the particular element as such, or in the form of a di- or polyhalide, di- or polyalkoxy compound or similar reactive compounds suitable for reaction to prepare the desired metallic derivative. The second aspect of the invention is in the process of manufacture which may be characterized by the method of reacting the dihalogen or dialkoxy compound of the element with a dilithium butadiene compound, or like compound having a conjugated double bond system. The reaction between the dihalogen compound of the element with the dilithium compound involves a direct replacement which may include ring closure as follows wherein the X represents a halogen:

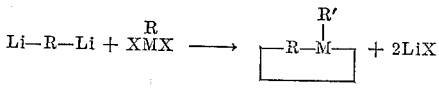

More specifically stated, the new compounds which correspond to this invention may be described by the following representations:

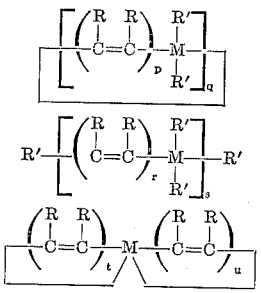

wherein:

R and R' may be the same and are selected from the group of common organic moieties consisting of hydrogen, vinyl, aryl, phenyl, alkyl, halogen, alkoxy, carboxyl, nitrile, etc.

M is any element having a valence greater than 1 other than carbon, sulphur, selenium, tellurium, oxygen and nitrogen and having side substituents only to the extent its valence exceeds 2.

$p, q, r, s, t, u$ are integers having finite values so related that when $r$ is 1, $s$ is at least 2 and when $r$ is 2, $s$ is at least 1.

The result of the reaction is that the product may be the corresponding heterocyclic compound of the element or a polymer.

In general, reaction between the two materials is substantially instantaneous and there appears to be no problem involved in causing the reaction to occur. However, there is the normal problem of controlling the rate of reaction and, accordingly, the use of a solvent to moderate conditions is generally indicated. The compounds, namely, di or polyhalide compounds in general, are soluble in chlorinated hydrocarbons and such materials as ethyl ether, propyl ether or heavier ethers and similar high boiling hydrocarbons. The further condition of the reaction is that it must be conducted under anhydrous conditions and the solvent utilized must be inert to reaction with lithium. It is also desirable to conduct the reaction in the absence of oxygen and carbon dioxide and, accordingly, it is best carried out in an inert atmosphere such as nitrogen, or hydrocarbon vapor.

Inasmuch as the system is highly reactive and reaction is essentially spontaneous, pressure and temperature under which the reaction is to be conducted have no real meaning. Essentially, the only problem involved, therefore, is to conduct the reaction under reasonably moderate conditions of temperature, accompanied by dilution of reactants in a substantial volume of solvent, for example, and to recover the product in a reasonable yield. As a matter of actual practice, the reaction need not be conducted in solution. That is, the dihalogen compound of the element can be dispersed in a solvent or carrier in which it is not soluble and, likewise, the dilithium butadiene compound can be dispersed in a solvent in which it is not soluble. Contact of the reactant materials in such a medium, even with two immiscible solvents, is sufficient because, reactivity of the materials is such that reaction will occur and the intensity of the reaction will be somewhat moderated under such conditions.

Typical syntheses carried out in accordance with the invention are the following, wherein the precise conditions may be taken as adequately suited for carrying out the reaction with the particular metal or metalloid mentioned. However, it is to be understood that the conditions, solvents, temperatures, and the like, are merely illustrative and are consistent with the general definitions given.

EXAMPLE I 2.07 grams diphenylacetylene and 0.0804 gram of lithium shot were added to 20 milliliters diethyl ether (anhydrous) in a 50 milliliter round bottom, one-necked flask. The flask was stoppered and shaken 16 hours at room temperature. A 250 milliliter Erlenmeyer flask equipped with a magnetic stirring bar was charged with 125 milliliters anhydrous ether and cooled to 0° C. Dry nitrogen was injected continuously through a rubber closure. Dichlorphenyl phosphine (1.32 grams) was added by a syringe with stirring. The contents of the initial flask were removed by a syringe (filtered through a plug of glass wool) and added slowly with stirring to the phosphine contained in the flask. An immediate reaction took place yielding a light yellow solid. Upon completion of the addition, the solid was filtered, washed and recrystallized from benzene-ethanol. This yielded a yellow crystal, M.P. 259–261°.

$$\phi-C\equiv C-\phi + Li \longrightarrow Li-C=C-C=C-Li \quad (I)$$
$$\phantom{\phi-C\equiv C-\phi + Li \longrightarrow Li-C=C-}\phi\phantom{=}\phi\phantom{=}\phi\phantom{=}\phi$$

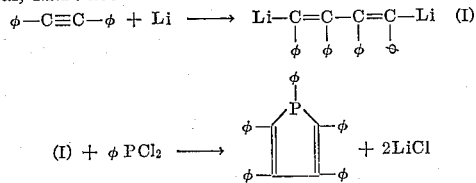

$$(I) + \phi PCl_2 \longrightarrow \phantom{xxx} + 2LiCl$$

EXAMPLE II

A solution of 0.01 mole of 1,4-dilithium-1,2,3,4-tetraphenyl butadiene in 40 milliliter anhydrous diethyl ether was placed in a flask equipped with a magnetic stirrer and an inert atmosphere of dry nitrogen. An additional funnel containing 0.005 mole of stannic chloride as the etherate was attached. The stannic chloride etherate was leached into the reaction flask with 50 milliliters of diethyl ether at room temperature. After stirring for four hours, the ether was evaporated off. The products were taken up in methylene chloride. The inorganic salts filtered off and the organo-metallic heterocyclic compounds crystallized by addition of methanol. The organo-metallic spiro compound, thus prepared, was in the form of yellow crystals, melting point 281° C. Its structural formula is:

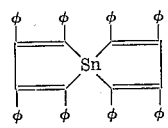

Typical compounds prepared in accordance with the invention are the following:

Table

| Dihalide Reactant | Product Formula | Appearance | M.P., ° C. |
|---|---|---|---|
| $(CH_3)_2SnCl_2$ | 1, 1 dimethyl-2, 3, 4, 5-tetraphenyl stannole | Colorless needles | 192–3 |
| $\phi PCl_2$ | Pentaphenyl Phosphole | Yellow needles | 261–2 |
| $\phi AsCl_2$ | Pentaphenyl Arsenole | ____do____ | 215–6 |
| $\phi SbCl_2$ | Pentaphenyl Stibole | ____do____ | 160 |
| $SnCl_4$ | Octaphenyl-1,1'-Spirobistannole | ____do____ | 281 |

Accordingly, from the preceding examples, it will be seen that compounds made in accordance with the process outlined conform to the general formula of the series of compounds defined. In summary, the properties of the compounds are that they are solids having relatively high melting points. They are usually soluble in aromatic solvents, such as benzene, toluene, xylene. Because of the content of the metal and other aspects of the structure, the compounds have rather wide utility in practically all applications wherein organo metallic compounds can be used. Accordingly, insecticide, catalysts for the formation of polymers, stabilizers for the decomposition of polymers, heavy metal components for incorporation into polymers are indicated. They are also useful as antiknock agents in internal combustion engine fuels and serve to provide the metal in useful soluble form as a component in a fluid catalyst system particularly.

What is claimed is:

A compound corresponding to the following formula:

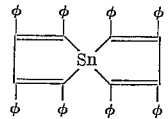

References Cited in the file of this patent

UNITED STATES PATENTS 2,160,915    Schreiber _____ June 6, 1939
2,839,566    Letsinger et al. _____ June 17, 1958

OTHER REFERENCES

Patterson-Capell: "The Ring Index," A.C.S. Monograph No. 84, Reinhold Publ. Corp., 1940, pp. 43, 44, 54, 56 relied on. (Copy in Div. 63.)

Krause et al.: "Die Chemie der metall-organischen Verbindungen," published by Verlag von Gebrüder Borntraeger, 1937, pp. 364, 634, 635, 570, 567 and 565 relied on. (Copy in Div. 63.)